United States Patent
Nguyen et al.

(10) Patent No.: US 11,756,752 B2
(45) Date of Patent: Sep. 12, 2023

(54) ELECTRONIC DEVICE

(71) Applicant: Samsung Electronics Co., Ltd., Suwon-si (KR)

(72) Inventors: Dinh Quynh Nguyen, Bac Ninh province (VN); The Nam Nguyen, Bac Ninh province (VN); Danh Tung Tran, Bac Ninh province (VN); Xuan Truong Dao, Bac Ninh province (VN); Van Kien Pham, Bac Ninh province (VN)

(73) Assignee: Samsung Electronics Co., Ltd., Suwon-si (KR)

( * ) Notice: Subject to any disclaimer, the term of this patent is extended or adjusted under 35 U.S.C. 154(b) by 45 days.

(21) Appl. No.: 17/354,369

(22) Filed: Jun. 22, 2021

(65) Prior Publication Data

US 2021/0398756 A1 Dec. 23, 2021

(30) Foreign Application Priority Data

Jun. 23, 2020 (KR) .................. 10-2020-0076694

(51) Int. Cl.
*H01H 13/14* (2006.01)
*H01H 13/79* (2006.01)
*H04M 1/02* (2006.01)
*H04M 1/23* (2006.01)

(52) U.S. Cl.
CPC ............ *H01H 13/14* (2013.01); *H01H 13/79* (2013.01); *H04M 1/026* (2013.01); *H04M 1/23* (2013.01); *H01H 2215/004* (2013.01)

(58) Field of Classification Search
CPC .. H01H 13/14; H01H 13/79; H01H 2215/004; H01H 2215/012; H01H 2215/02; H01H 13/84; H01H 13/48; H01H 13/10; H04M 1/026; H04M 1/23; H04M 1/0277; H04M 2250/12; H04M 1/236; H04M 1/02; G06V 40/1306
See application file for complete search history.

(56) References Cited

U.S. PATENT DOCUMENTS 9,053,878 B2 * 6/2015 Kim .................... H04M 1/0274
10,141,133 B2 * 11/2018 Bae .................... G07C 9/00563
10,182,134 B2 * 1/2019 Lim .................... H03K 17/962
2012/0325637 A1 12/2012 Kikuchi \* cited by examiner

*Primary Examiner* — Lheiren Mae A Caroc
(74) *Attorney, Agent, or Firm* — Jefferson IP Law, LLP

(57) ABSTRACT

An electronic device including a button assembly is provided. The electronic device includes a housing, a button member which is at least partially exposed to the outside of the housing, a substrate portion disposed in an inner space of the housing, a dome switch module mounted on the substrate portion, a bracket mounted inside the housing, and a block member which is disposed between the dome switch module and the bracket and includes a base portion coupled to one surface of the bracket, a contact portion in contact with the dome switch module, and a support portion disposed on the periphery the contact portion.

20 Claims, 20 Drawing Sheets

ELECTRONIC DEVICE

CROSS-REFERENCE TO RELATED APPLICATION(S)

This application is based on and claims priority under 35 U.S.C. § 119(a) of a Korean patent application number 10-2020-0076694, filed on Jun. 23, 2020, in the Korean Intellectual Property Office, the disclosure of which is incorporated by reference herein in its entirety.

BACKGROUND

1. Field

The disclosure relates to an electronic device. More particularly, the disclosure relates to a button assembly for a portable electronic device.

2. Description of Related Art

Electronic devices tend to have smaller sizes, and optimal inner spaces are accordingly needed.

In line with the demands for compactness and flatness of electronic devices, electronic devices may have smaller thicknesses and narrower inner mounting spaces.

Components that may be mounted inside electronic devices, for example, buttons may be based on dome switches. The range of operation of buttons may be limited in the case of electronic devices having small thicknesses or narrow inner mounting spaces.

The above information is presented as background information only to assist with an understanding of the disclosure. No determination has been made, and no assertion is made, as to whether any of the above might be applicable as prior art with regard to the disclosure.

SUMMARY

An electronic device may include a curved surface on at least a part of the exterior of the housing thereof, in order to enhance the aesthetic appeal, or at least a part of the exterior of the housing may be formed to slant. This may further narrow the inner space of the housing.

As a result, a dome switch-based button, for example, mounted on the electronic device may have a problem in that, when pressed, the button may get stuck or may slip.

Aspects of the disclosure are to address at least the above-mentioned problems and/or disadvantages and to provide at least the advantages described below. Accordingly, an aspect of the disclosure is to provide a button assembly structured such that buttons, when pressed, are prevented from getting stuck or from sliding, and an electronic device including the same.

Additional aspects will be set forth in part in the description which follows and, in part, will be apparent from the description, or may be learned by practice of the presented embodiments.

In accordance with an aspect of the disclosure, an electronic device including a button assembly is provided. The electronic device includes a housing which includes a front housing facing a first direction, and a rear housing facing a second direction opposite to the first direction, and forming a space between the front housing and the rear housing, a button member which is at least partially exposed to the outside of the housing through at least a part of the rear housing, a substrate portion disposed on one surface of the button member in the space, a dome switch module mounted on the substrate portion, a bracket, and a block member which is disposed between the dome switch module and the bracket and includes a base portion coupled to one surface of the bracket, a contact portion in contact with the dome switch module, and a support portion disposed on a periphery of the contact portion, wherein one surface of the base portion is perpendicular to the front housing or the rear housing, and the contact portion is inclined at a predetermined angle with respect to the front housing or the rear housing in a direction toward the dome switch module.

In accordance with another aspect of the disclosure, an electronic device including a button assembly is provided. The electronic device includes a housing which includes a front housing facing a first direction, and a rear housing facing a second direction opposite to the first direction, and forming a space between the front housing and the rear housing, a button member which is at least partially exposed to the outside of the housing through at least a part of the rear housing, a substrate portion disposed on one surface of the button member in the space, a dome switch module mounted on the substrate portion, a bracket mounted on the front housing or the rear housing, and a block member which is disposed between the dome switch module and the bracket and includes a base portion coupled to one surface of the bracket, a contact portion in contact with the dome switch module, and a support portion disposed on a periphery of the contact portion, wherein the support portion includes a protrusion portion protruding toward the dome switch module, and a height of the protrusion portion is formed to be lower than a thickness of the dome switch module.

Various embodiments may provide an electronic device having an input button that can be clicked with an improved level of convenience, thereby solving problems occurring in the prior art.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
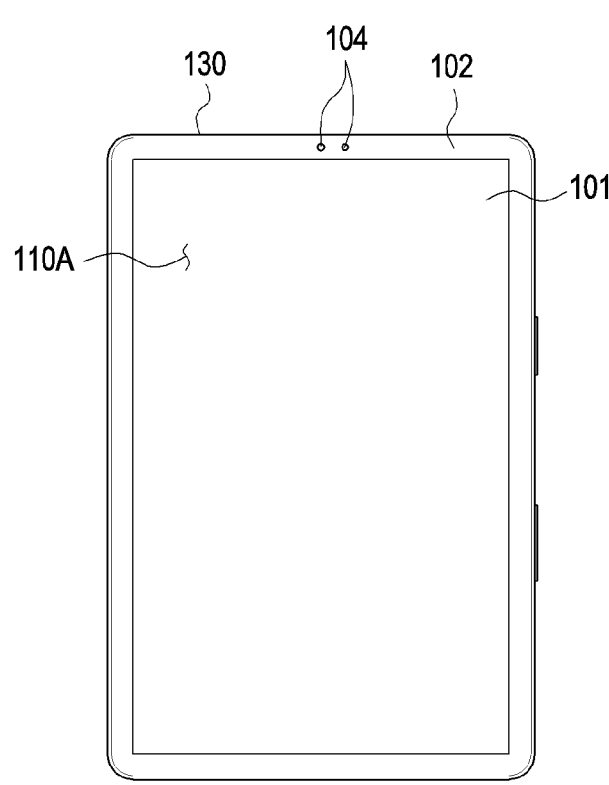
FIG. 1A is a front view of an electronic device according to an embodiment of the disclosure.

FIG. 1A is a front view of an electronic device according to an embodiment of the disclosure.

Figure 1B:
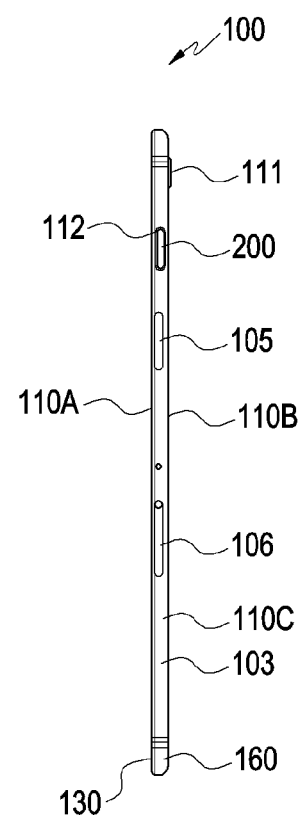
FIG. 1B is a side view of an electronic device according to an embodiment of the disclosure.

FIG. 1B is a side view of an electronic device according to an embodiment of the disclosure.

Figure 1C:
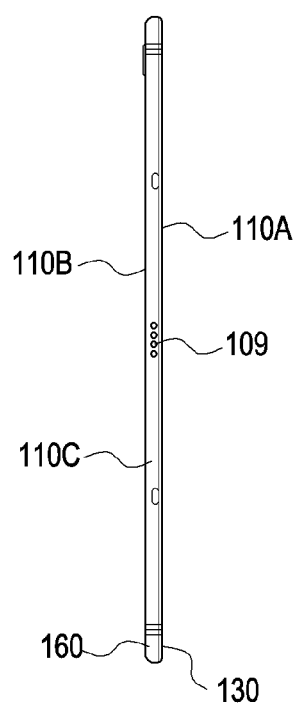
FIG. 1C is a side view of an electronic device according to an embodiment of the disclosure.

FIG. 1C is a side view of an electronic device according to an embodiment of the disclosure.

Figure 1D:
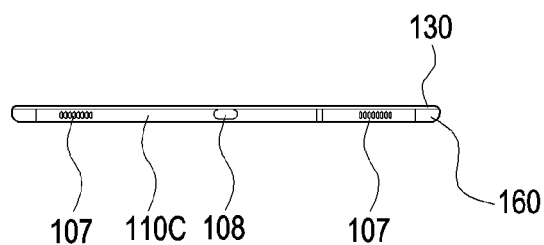
FIG. 1D is a side view of an electronic device according to an embodiment of the disclosure.

FIG. 1D is a side view of an electronic device according to an embodiment of the disclosure.

Figure 2:
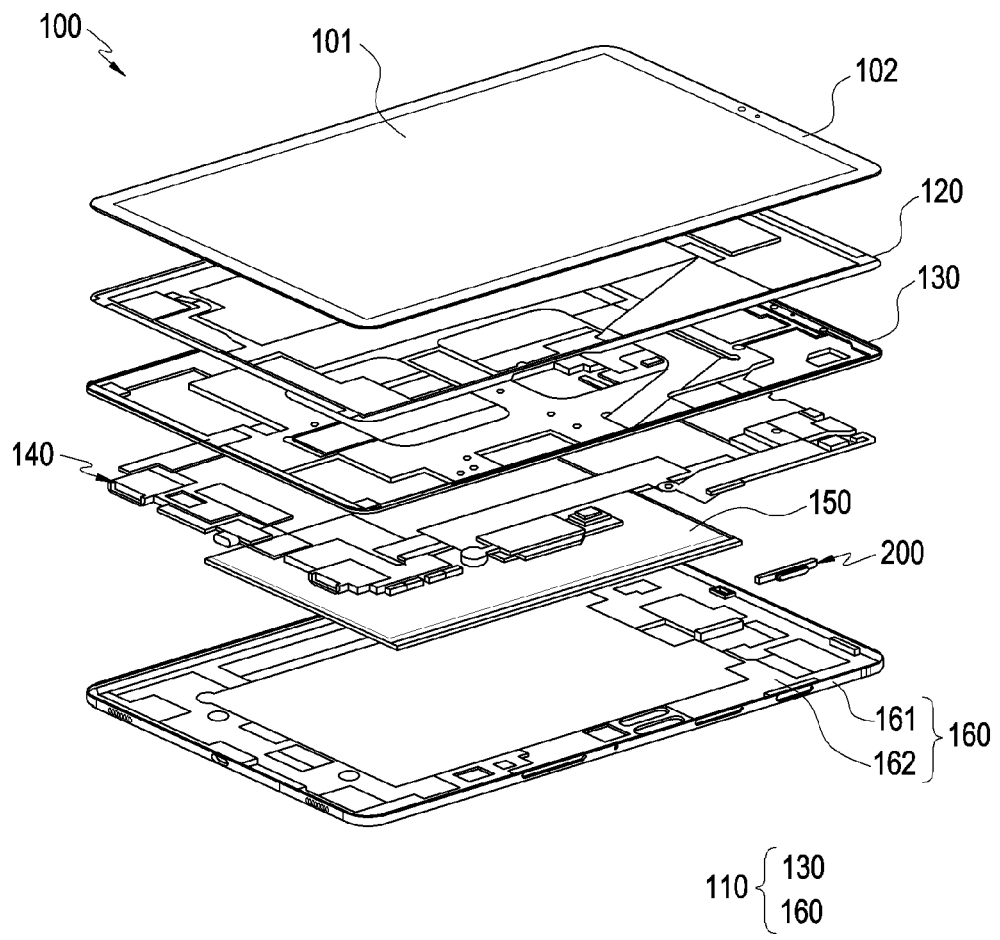
FIG. 2 is an exploded perspective view of the electronic device of FIG. 1A according to an embodiment of the disclosure.

FIG. 2 is an exploded perspective view of the electronic device of FIG. 1A according to an embodiment of the disclosure.

Referring to FIGS. 1A, 1B, 1C, 1D, and 2, an electronic device 100 according to an embodiment may include a housing 110 which includes a first surface (or a front surface) 110A facing a first direction, a second surface (or a rear surface) 110B facing in a direction opposite to the first direction, and a side surface 110C surrounding a space between the first surface 110A and the second surface 110B. In another embodiment (not shown), the housing may refer to a structure which forms a part of the first surface 110A, the second surface 110B, and the side surface 110C of FIGS. 1A to 1D. According to an embodiment, at least a part of the first surface 110A may be formed by a front housing 130 which is substantially transparent. The front housing 130 may include a plate 102 (e.g., a polymer plate or a glass plate including various coating layers). The second surface 110B may be formed by a rear housing 160 which is substantially opaque. The rear housing 160 may be formed of, for example, coated or colored glass, a ceramic, a polymer, a metal (e.g., aluminum, stainless steel (STS), or magnesium), or a combination of at least two of the above materials. The side surface 110C may be formed by a side member 103 coupled to the front housing 130 and the rear housing 160 and including a metal and/or a polymer. In an embodiment, the rear housing 160 and the side member 103 may be integrally formed and include the same material (e.g., a metal material such as aluminum).

According to an embodiment, the electronic device 100 may include at least one of a display 101, an audio module 107, a sensor module 104, a camera module 111, key input devices 105 and 106, an indicator 109, and a connector hole 108. In an embodiment, at least one (e.g., the key input devices 105 and 106 or the indicator 109) of the components may be omitted in the electronic device 100 or the electronic device 100 may additionally include other components.

For example, the display 101 may be exposed through a significant part of the front housing 130. In an embodiment, at least a part of the display 101 may be exposed through the first surface 110A and the plate 102. The display 101 may be coupled to or disposed adjacent to a touch sensing circuit, a pressure sensor capable of measuring the intensity (pressure) of a touch, and/or a digitizer which detects a magnetic field-type stylus pen.

The audio module 107 may include a microphone hole and a speaker hole. A microphone for obtaining external sound may be disposed inside the microphone hole, and, in an embodiment, a plurality of microphones may be disposed inside the microphone hole to be able to detect a direction of sound. The speaker hole may include an external speaker hole and a receiver hole for a call. In an embodiment, the speaker hole and the microphone hole may be implemented as a single hole, or a speaker may be included without the speaker hole (e.g., piezo speaker).

The sensor module 104 may generate an electrical signal or data value corresponding to an internal operating state of the electronic device 100 or an external environment state. For example, the sensor module 104 may include a first sensor module 104 (e.g., a proximity sensor) disposed on the first surface 110A of the housing 110, and/or a second sensor module (not shown) (e.g., a heart rate monitor (HRM) sensor). According to an embodiment, the electronic device 100 may further include a sensor module which is not shown, for example, at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera module 111 may include a camera device and/or a flash disposed on the second surface 110B. According to another embodiment, although not shown in the drawings, the camera module 111 may further include a camera device disposed on the first surface 110A of the electronic device 100. The camera device may include one or more lenses, an image sensor, and/or an image signal processor. The flash may include, for example, a light-emitting diode or a xenon lamp. In an embodiment, two or more lenses (an infrared camera, and wide-angle and telephoto lenses) and image sensors may be arranged on one surface of the electronic device 100.

The key input devices 105 and 106 may include a side key button disposed on the side surface 110C of the housing 110. In another embodiment, the electronic device 100 may not include a part or all of the above-mentioned key input devices 105 and 106.

The electronic device 100 according to various embodiments may include a button assembly 200 alternatively or additionally to the above-described key input devices 105 and 106. The button assembly 200 will be described in detail later with reference to an embodiment below FIG. 2.

For example, the indicator 109 may be disposed on the side surface 110C of the housing 110. However, it is not necessarily limited thereto, and the indicator 109 may be disposed on the front surface (i.e., first surface 110A) and/or the rear surface (i.e., second surface 110B) of the housing 110. For example, the indicator 109 may provide state information of the electronic device 100 in the form of light, and may include a light emitting diode (LED).

The connector hole 108 may include a connector hole which can receive a connector (e.g., a universal serial bus (USB) connector) for transmitting or receiving power and/or data to or from an external electronic device, and/or a second connector hole (e.g., an earphone jack) which can receive a connector for transmitting or receiving an audio signal to or from an external electronic device.

Referring to FIG. 2, the electronic device 100 may include the display 101, the plate 102 surrounding the display 101, a bracket 120, the front housing 130, a printed circuit board 140, and/or various electronic components, a battery 150, the rear housing 160, and the button assembly 200.

In an embodiment, at least one (e.g., the bracket 120) of the components may be omitted in the electronic device 100 or the electronic device 100 may additionally include other components. According to another embodiment, the electronic device 100 may be configured differently from an embodiment in which a position of a part of the components is shown. For example, in relation to positions of the front housing 130 and the bracket 120, unlike shown in FIG. 2, the bracket 120 may be positioned on a rear surface of the front housing 130. The components of the electronic device 100 of FIG. 2 may be the same as or similar to at least one of the components of the electronic device 100 of FIG. 1A, and redundant description will be omitted below.

The bracket 120 may be disposed inside the electronic device 100 to be connected to the front housing 130, or may be integrally formed with the front housing 130. The bracket 120 may be formed of, for example, a metallic material and/or a non-metallic (e.g., polymer) material. The bracket 120 may be coupled to the display 101 on one surface thereof. Otherwise, in a case where the bracket 120 is disposed on the rear surface of the front housing 130, a printed circuit board and/or various electronic components may be coupled to the bracket.

The printed circuit board 140 may include a processor, a memory, and/or an interface mounted thereon. Various electronic components may include a camera module and various sensor modules. The processor may include, for example, one or more of a central processing unit, an application processor, a graphic processing unit, an image signal processor, a sensor hub processor, or a communication processor. The memory may include, for example, a volatile memory or a nonvolatile memory. The interface may include, for example, a high definition multimedia interface (HDMI), a universal serial bus (USB) interface, a secure digital (SD) card interface, and/or an audio interface. For example, the interface may electrically or physically connect the electronic device 100 to an external electronic device, and include a USB connector, an SD card/multimedia card (MMC) connector, or an audio connector.

The battery 150 is a device for supplying power to at least one component of the electronic device 100 and may include, for example, a non-rechargeable primary cell, a rechargeable secondary cell, or a fuel cell. For example, at least a part of the battery 150 may be disposed on the substantially same plane as the printed circuit board 140.

The battery 150 may be integrally disposed inside the electronic device 100 or may be disposed detachably from the electronic device 100.

The rear housing 160 may configure the housing 110 of the electronic device 100 together with the front housing 130 to protect all or a part of various components inside the electronic device 100 from physical/chemical impacts outside the housing. The housing 110 can prevent interference with an electronic component due to a display panel. In addition, the housing 110 may be configured to form the exterior of the electronic device.

The rear housing 160 may be a frame for fixing and supporting a plurality of electronic components. The rear housing 160 may have a plurality of outer walls (or side walls), and the outer walls may form an exterior part of the electronic device 100. According to an embodiment, the rear housing 160 may have at least one inner wall. The at least one inner wall may form a reception space for various components in the electronic device 100 between the outer walls, and the reception space may be divided into a plurality of spaces by the at least one inner wall.

The rear housing 160 may include a side member 161 (e.g., the side member 103 of FIG. 1B) and a rear plate 162. The side member 161 may be a part which forms the side surface 110C, the rear plate 162 may be a part which forms the second surface 110B, and the side member 161 and the rear plate 162 may be integrally coupled to each other according to an embodiment. The side surface 110C may be substantially perpendicular to the second surface 110B, but is not limited thereto. According to an embodiment, the side surface 110C may be formed to be inclined with respect to the second surface 110B, and may be formed to be inclined with respect to a surface substantially perpendicular to the second surface 110B. By giving an inclination to the side surface 110C, the exterior of the housing 110 can be made more beautiful.

Referring back to FIG. 1B, the button assembly 200 is received in the housing 110 of the electronic device 100, but at least a part of the button assembly 200 may be exposed to the outside of the housing 110 of the electronic device 100. According to various embodiments, the position and number of the button assembly 200 may be variously configured. For example, instead of the button assembly 200 shown in the drawing, a plurality of button assemblies 200 may be provided to receive user inputs independent of each other.

According to various embodiments, the rear housing 160 may include a seating recess for receiving at least one button assembly 200, and at least one button hole 112 for accessing a button. The seating recess may be defined by one of the outer walls of the rear housing 160, the outer walls defining an external shape of the electronic device, and the inner walls of the rear housing 160, the inner walls separating reception spaces for different internal components.

The electronic device 100 according to various embodiments may be applied to, for example, a mobile device or a small electronic device such as a wearable device. In this case, according to the demand for miniaturization and thinning of the electronic device 100, the thickness of the electronic device may be very thin. In addition, the electronic device 100 may include a large number of curved surfaces on the exterior of the housing for the purpose of enhancing aesthetic sensibility, and an inner space of the housing adjacent to a curved surface may be further narrowed. According to another embodiment, in the electronic device 100, the side surface 110C of the housing may not be formed perpendicular to the adjacent surface (e.g., the second surface 110B) of the housing, but formed to be inclined, and thus an inner space of the housing may be narrow. Accordingly, the button assembly 200 mounted on the side surface 110C of the electronic device and including a dome switch module may be mounted to be inclined from the side surface due to a small mounting space inside the electronic device 100. Accordingly, a sticking phenomenon and a slipping phenomenon may occur during the operation of a button. In various embodiments, a description may be made focusing on the button assembly 200 disposed on the side surface 110C of the electronic device 100.

Figure 3:
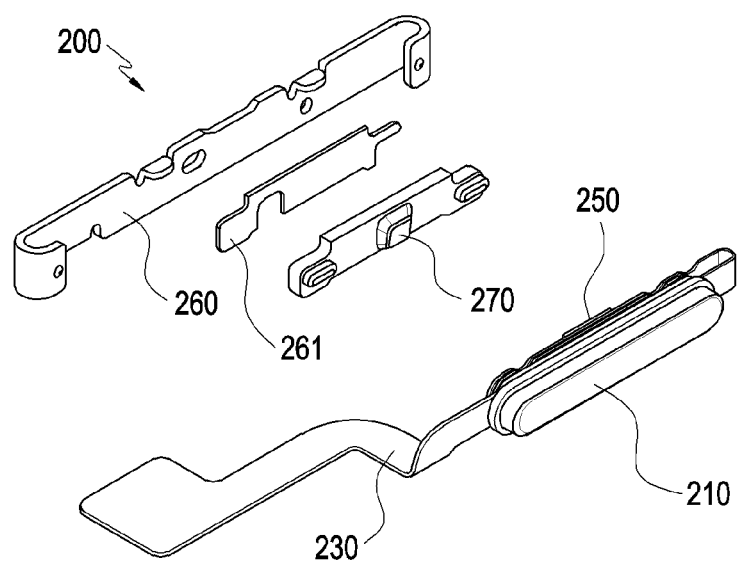
FIG. 3 is a perspective view of a button assembly according to an embodiment of the disclosure.

FIG. 3 is a perspective view of a button assembly according to an embodiment of the disclosure.

Figure 4A:
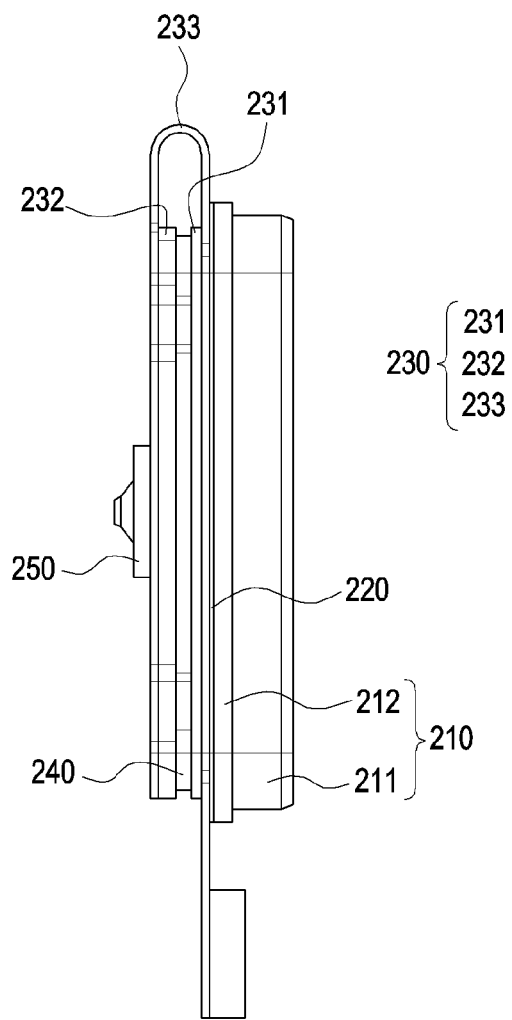
FIG. 4A illustrates a state in which a button member, a substrate portion, and a switch module of a button assembly are coupled to each other, according to an embodiment of the disclosure.

FIG. 4A illustrates a state in which a button member, a substrate portion, and a dome switch module of a button assembly are coupled to each other, according to an embodiment of the disclosure.

Figure 4B:
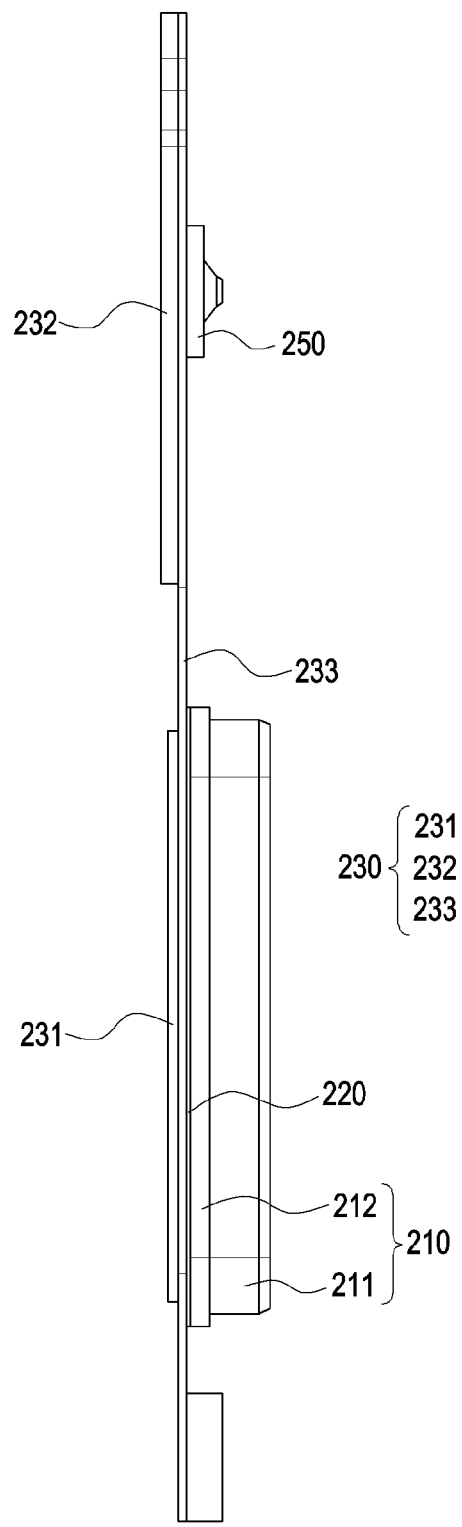
FIG. 4B illustrates a state in which a substrate portion is unfolded, according to an embodiment of the disclosure.

FIG. 4B illustrates a state in which a substrate portion is unfolded in the embodiment shown in FIG. 4A according to an embodiment of the disclosure.

Referring to FIG. 3, the button assembly 200 may include a button member 210, a substrate portion 230, a dome switch module 250, a bracket 260, and a block member 270. However, it is not necessarily limited thereto, and one or more of the above-described components may be omitted, or other components may be added. For example, the bracket 260 may be a part of the housing 110 rather than the button assembly 200.

The button member 210 may have a size and a shape suitable for insertion into the button hole 112 while allowing movement in a third direction (which is inclined with respect to the first direction and/or a second direction). The button member 210 may include a button top 211 which exposes at least a part of the button member 210 to the outside of the electronic device, and a flange 212 for preventing the button member from leaving a position where the button member is mounted and being drawn out to the outside.

The button assembly 200 may include the substrate portion 230 disposed on one surface of the button member 210. The substrate portion 230 may have an extending shape to be able to be electrically connected to other electronic components inside the electronic device 100. According to an embodiment, the substrate portion 230 may correspond to a flexible substrate portion 230. The button member 210 and the dome switch module 250 may be mounted on one surface of the substrate portion 230. FIG. 4A illustrates an embodiment in which the button member 210 and the dome switch module 250 face in different directions as the substrate portion 230 is flexibly folded, but FIG. 4B illustrates an embodiment in which the button member 210 and the dome switch module 250 face in the same direction in a state in which the substrate portion 230 is unfolded.

The button assembly 200 may be disposed inside the seating recess of the rear housing 160 within a space defined by the front housing 130 and the rear housing 160. According to an embodiment, the button assembly 200 may be exposed to the outside through the button hole 112 of the rear housing 160 while being disposed inside the seating recess. The button assembly 200 may include the bracket 260 (e.g., the bracket 120 of FIG. 2) mounted on an inner wall of the housing to reinforce a structure of the button assembly 200 in the housing, the button assembly being disposed in the seating recess, and allow the block member 270 to be mounted. According to an embodiment, the bracket 260 may be formed of a non-metallic and/or metallic material.

The button assembly 200 may further include the block member 270. The block member 270 may be disposed between the dome switch module 250 and the bracket 260 and include a base portion 271 coupled to one surface (e.g., one surface 260A of FIG. 5A to be described later) of the bracket 260, a contact portion 272 in contact with at least a part of the dome switch module 250, and a support portion 273 disposed on the periphery of the contact portion. According to an embodiment, a second adhesive member 261 may be provided on one surface of the bracket 260, and the block member 270 may be bonded to the bracket 260 by using the second adhesive member 261. Therefore, even when the block member 270 is in contact with the dome switch module 250 and a user applies a force on the button member 210, the block member 270 is supported by the bracket 260 so that the block member can be prevented from moving.

According to various embodiments, the block member 270 and the bracket 260 may be coupled by a fastening means not shown in the drawings, and the second adhesive member 261 may be omitted according to embodiments.

Referring to FIG. 4A, a stacked structure of the button member 210, the substrate portion 230, and the dome switch module 250 is shown. FIG. 4B illustrates a state in which the substrate portion 230 is unfolded, according to various embodiments.

According to various embodiments, the button assembly 200 may further include a fingerprint sensor unit 220. According to an embodiment, the fingerprint sensor unit 220 may receive a touch signal and recognize a fingerprint input from the button member 210 in order to identify a user.

As an example of the fingerprint sensor unit 220, an optical fingerprint recognition sensor may be proposed. An optical fingerprint recognition sensor using light may be proposed. The optical fingerprint recognition sensor using light may detect an image corresponding to at least a part (e.g., a ridge portion or a valley portion) of a fingerprint of a user by emitting light onto a finger of the user. As another example of the fingerprint sensor unit 220, a capacitive fingerprint recognition sensor may be proposed. Information on a user's fingerprint may be obtained by detecting a change in capacitance for each electrode according to the flexure of a ridge portion or a valley portion in contact with a fingerprint recognition sensor. As another example of the fingerprint sensor unit 220, an ultrasonic fingerprint recognition sensor may be proposed. The ultrasonic fingerprint recognition sensor may obtain information on a user's fingerprint by comparing the amount of ultrasonic waves received according to the flexure of a ridge portion or a valley portion with a pre-stored value.

The substrate portion 230 may include a first flexible printed circuit board (FPCB) 231 and a second FPCB 232. According to an embodiment, the fingerprint sensor unit 220 may be mounted on the first FPCB 231, and the dome switch module 250 may be mounted on the second FPCB 232. Referring to FIGS. 4A and 4B together, a flexible portion 233 for connecting the first FPCB 231 and the second FPCB 232 may be further included between the first FPCB 231 and the second FPCB 232. For example, at least a part of the flexible portion 233 may be formed to have a "U" shape. The flexible portion 233 includes a part formed in a "U" shape, so that it may be advantageous to reduce the length or volume of the entire substrate portion 230. One substrate portion 230 may be used to implement an electrical connection of the fingerprint sensor unit 220 and the dome switch module 250, which are formed to face two different directions based on the substrate portion 230, to other electronic components. According to various embodiments, the substrate portion 230 may be reinforced by a plate made of metal (e.g., steel, aluminum, alloy, etc.), a plastic, or glass fiber.

A first adhesive member 240 for bonding between the first FPCB 231 and the second FPCB 232 may be disposed on one side of the substrate portion 230. The first adhesive member 240 is included, so that the shape of the button assembly 200 in which a plurality of components are stacked and coupled can be stably maintained. According to an embodiment, the first adhesive member 240 may correspond to a double-sided adhesive tape.

The dome switch module 250 may be mounted on the second FPCB 232. The dome switch module 250 may include a dome sheet (a dome sheet 251 of FIG. 5B to be described later) for providing a contact function, and a dome switch case (a dome switch case 254 of FIG. 5B to be described later) for allowing the dome sheet to be mounted thereon. In addition, the dome switch module 250 may include a switch electrode (a switch electrode 257 of FIG. 5B to be described later) disposed in a circuit portion provided in the dome switch case or the second FPCB 232. In addition, the dome switch module 250 may further include an actuator (i.e., an actuator 253 of FIG. 5B to be described later) which is attached to the dome sheet and forms a robust contact surface with respect to the dome sheet together with the block member. The actuator may serve as a cap which covers and protects at least a part of the dome sheet and/or an exterior skin (an exterior skin 252 of FIG. 5B to be described later).

Figure 5A:
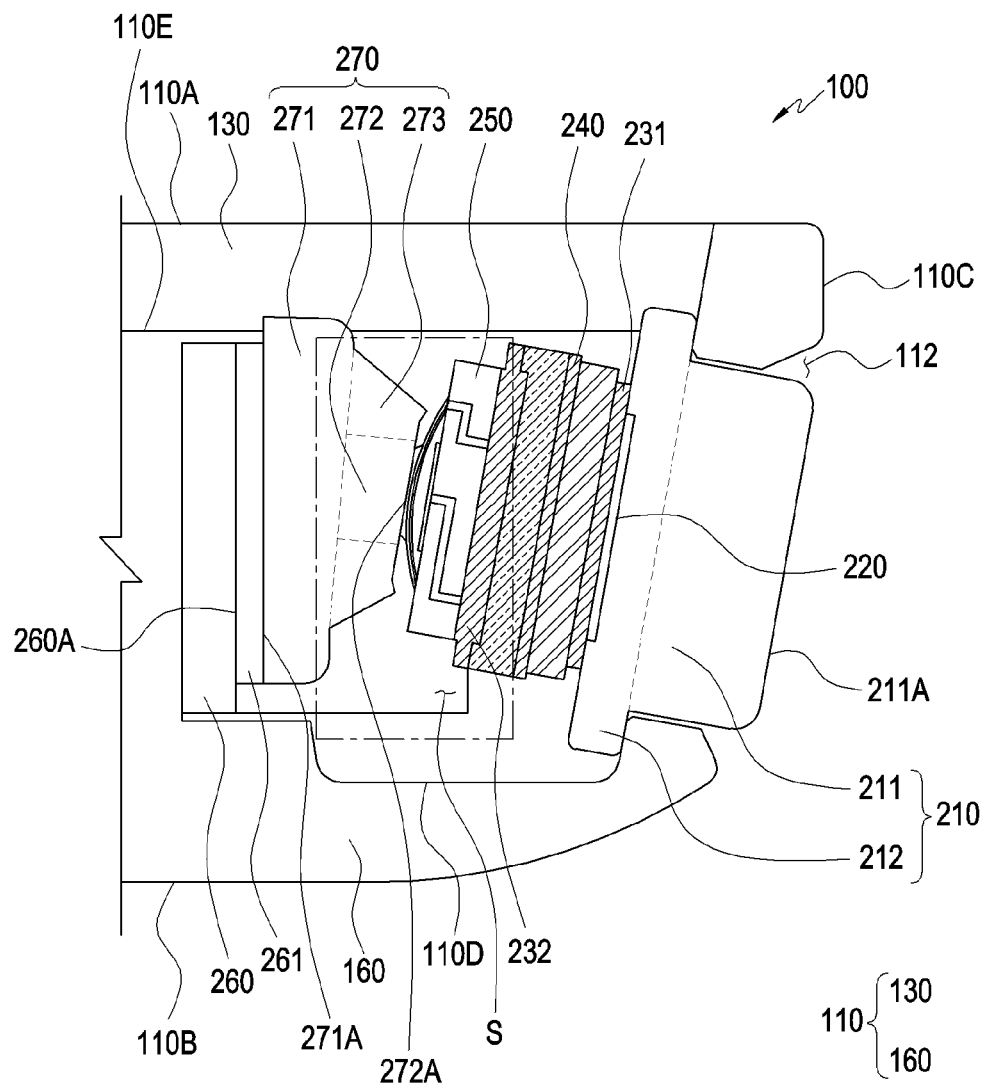
FIG. 5A is a cross-sectional view illustrating a button assembly inside an electronic device, according to an embodiment of the disclosure.

FIG. 5A is a cross-sectional view illustrating a button assembly inside an electronic device, according to an embodiment of the disclosure.

Figure 5B:
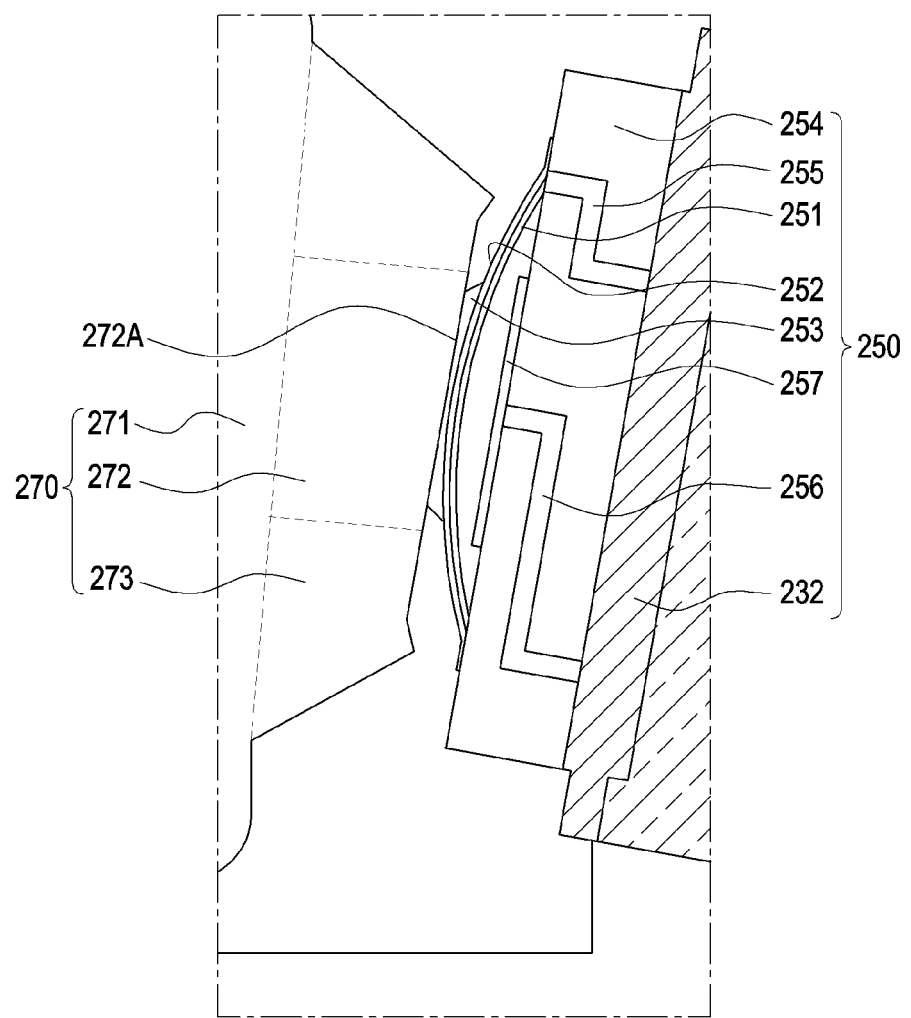
FIG. 5B is an enlarged view of a dashed line area in FIG. 5A according to an embodiment of the disclosure.

FIG. 5B is an enlarged view of a dashed line area in FIG. 5A according to an embodiment of the disclosure.

Figure 5C:
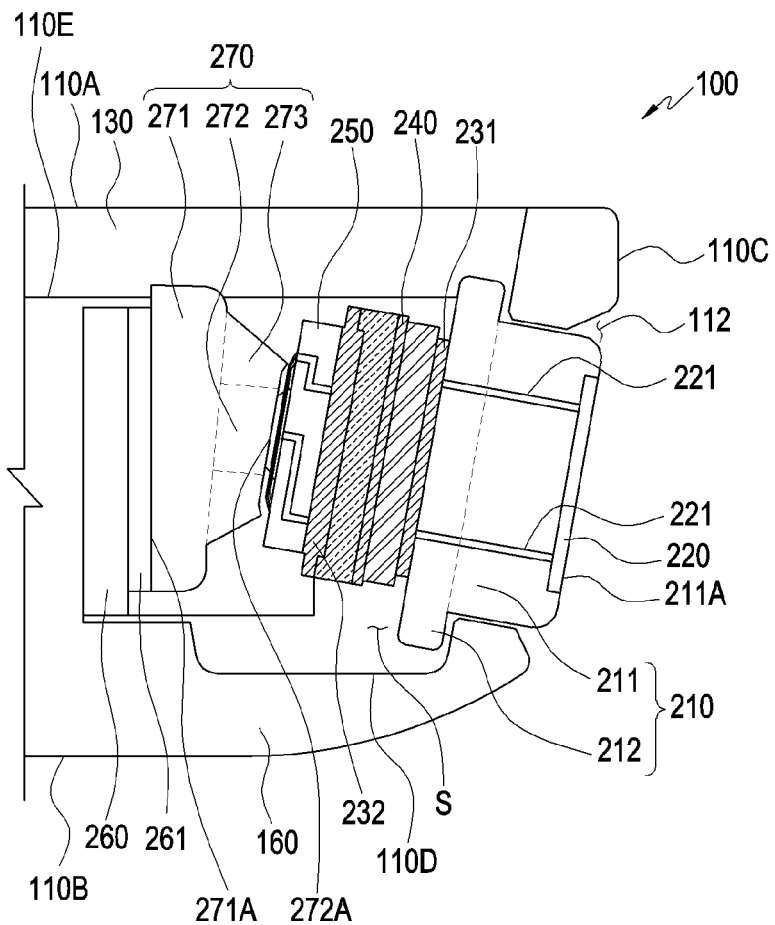
FIG. 5C is a cross-sectional view illustrating a button assembly inside an electronic device, according to an embodiment of the disclosure.

FIG. 5C is a cross-sectional view illustrating a button assembly inside an electronic device, according to an embodiment of the disclosure.

Referring to FIG. 5A, the button member 210 may be disposed on the surface of the housing of the electronic device 100, and formed such that the button assembly 200 can be entirely operated in an inner space S of the electronic device 100 by the button member 210. Although described above, the inner space S may be defined by the front housing 130 and the rear housing 160. The button member 210 may include the button top 211 disposed in the button hole 112 of the housing 110. The button top 211 has a plate shape, and a touch surface 211A of the button top may be pressed by a user. The button member 210 may further include the flange 212 radially extending from the side surface of the button top 211, and the flange 212 can prevent the button assembly 200 from being separated in a direction opposite to a button-pressing direction when a button is pressed.

The first FPCB 231 and the second FPCB 232 may be fixed to each other by the first adhesive member 240, and connected by the flexible portion 233. The first FPCB 231 and the second FPCB 232 may configure a stacked structure which provides a comfortable click operation to a user and provides stability to the fingerprint sensor unit 220 disposed in an inclined area of the button assembly 200.

Referring to FIG. 5B, according to various embodiments, the dome sheet 251 included in the dome switch module 250 may have the exterior skin 252, such as an exterior member made of rubber, a plastic such as polyethylene terephthalate, or any other suitable material.

The dome sheet 251 may include a metal dome to provide greater strength and elasticity to the dome sheet. The metal dome may be made of a conductive material having gold or other suitable conductive materials attached thereto and disposed below the exterior skin 252. The metal dome may be formed to have a shape protruding upward from an upper end of the dome switch case. The dome sheet 251 may be attached together with the dome switch case 254 by an adhesive, and the metal dome may be soldered onto an upper surface of the dome switch case and thus mounted on a solder pad of the dome switch case.

The metal dome may receive a pressing force from the block member 270 mounted on the housing 110 when the button member 210 is pressed toward the block member 270. As the metal dome is pressed, the dome sheet 251 may collapse. When the dome sheet 251 is in a collapsed state, the metal dome sheet may be in contact with the switch electrode 257. In this case, a switch or a button may be switched to an "ON" or "Active" state.

The dome switch case 254 may include a first conductive trace 255 and a second conductive trace 256 for electrically connecting the switch electrode 257 and the substrate portion 230 (e.g., the second FPCB 232). One end of the first conductive trace 255 may be electrically connected to the dome sheet 251, and one end of the second conductive trace 256 may be electrically connected to the switch electrode 257. The other end of the first conductive trace 255 and the other end of the second conductive trace 256 may be electrically connected to the substrate portion 230.

The fingerprint sensor unit 220 according to various embodiments may be disposed at various positions. According to an embodiment, the fingerprint sensor unit 220 may be disposed between the button member 210 and the dome switch module 250. For example, as shown in FIG. 5A, the fingerprint sensor unit 220 may be mounted on one side surface of the substrate portion 230. For another example, the fingerprint sensor unit 220 may be mounted on both side surfaces of the substrate portion 230.

According to another embodiment, at least a part of the fingerprint sensor unit 220 may be integrated into the button member 210. For example, the fingerprint sensor unit 220 may be disposed on one surface (i.e., touch surface 211A) of the button member 210. In this case, at least one conductive line 221 for connecting the fingerprint sensor unit 220 to the substrate portion 230 may be disposed at one surface of the button member 210. In this case, the fingerprint sensor unit 220 may directly receive a touch input by a user to recognize a fingerprint. Referring to FIG. 5C, the button member 210 may include a plurality of conductive lines 221 connected to the fingerprint sensor unit 220 to recognize user information. According to various embodiments, the fingerprint sensor unit 220 and the button member 210 may be bonded through bonding, taping, ultrasonic welding, or the like. In addition, the fingerprint sensor unit 220 may be formed by insert-injection of at least a part or the entirety thereof into an inner space of the button member 210.

For example, the button member 210 may receive a button operation energy transmitted from an outsider's finger contact, transmit the button operation energy to the dome switch module 250, and collapse the dome sheet 251 through the button operation energy to switch a dome switch. In a case where the dome switch module 250 is at an operation or collapse position, for example, when the button member 210 is pressed by a user's finger, sufficient pressure for overcoming the pressure applied by the user may be applied to the dome sheet 251 of the dome switch module 250. According to an embodiment, the dome sheet 251 may operate like a compression spring which forms an outward pressure.

According to an embodiment, the dome sheet 251 may be made of a deformable material. In this case, the surface of the dome sheet 251 in contact with the contact portion 272 may be deformed after a predetermined time. The dome sheet 251 may have a reduced contact area with the contact portion 272 or deviate from the center of the dome switch module 250 according to the lapse of a predetermined time or repetitive use. Such a deformation may affect a function of the dome switch. In addition, the dome sheet 251 is configured to have a dome shape, and thus the contact area with the switch electrode 257 is limited, so that an electrical connection between the dome sheet 251 and the switch electrode may not be made smoothly.

Accordingly, the dome switch module 250 may further include the actuator 253 attached to a tip area of the dome sheet 251. The actuator 253 may define a robust contact surface of the dome sheet 251 with the block member 270. In addition, the actuator 253 may support a dome electrode to come in contact with the switch electrode 257, so as to improve an electrical connection. According to an embodiment, the actuator 253 may be formed to have a circular shape having a predetermined thickness at the central position of the dome sheet 251.

The block member 270 may further include the base portion 271 for limiting a movement of the button member 210 and supporting a compressed area of the dome switch module 250 due to collapse of the dome sheet 251. The base portion 271 may be coupled to the bracket 260 by the second adhesive member 261 disposed between the bracket 260 and the base portion 271. However, an embodiment relating to the coupling between the base portion 271 and the bracket 260 is not limited thereto. According to another embodiment, the base portion 271 may include a separate fastening portion not shown in the drawings, and may be coupled to the bracket 260 by using the fastening portion.

The block member 270 may include the contact portion 272 and the support portion 273. The contact portion 272 may define a contact surface 272A in contact between the dome switch module 250 and the block member 270. The contact portion 272 may be disposed at a position corresponding to the actuator 253 of the dome switch module 250. Further, when the contact portion 272 is in contact with the actuator 253, the contact portion is in contact with the actuator at an end of the surface of the actuator 253 and/or at a plurality of other parts of the actuator 253, so that the contact can be ensured in an input state of the button assembly 200 and a collapsed state of the dome sheet 251. For example, the contact portion 272 may have a plurality of contact points with a collapsed shape of the dome switch module 250. For another example, the surface of the contact portion 272 may face the dome switch module 250 in at least a part thereof.

The support portion 273 may be disposed on the periphery of the contact portion 272 in order to increase the hardness of the block member 270 and prevent the dome switch module 250 from slipping from a contact surface of the block member 270.

Figure 6:
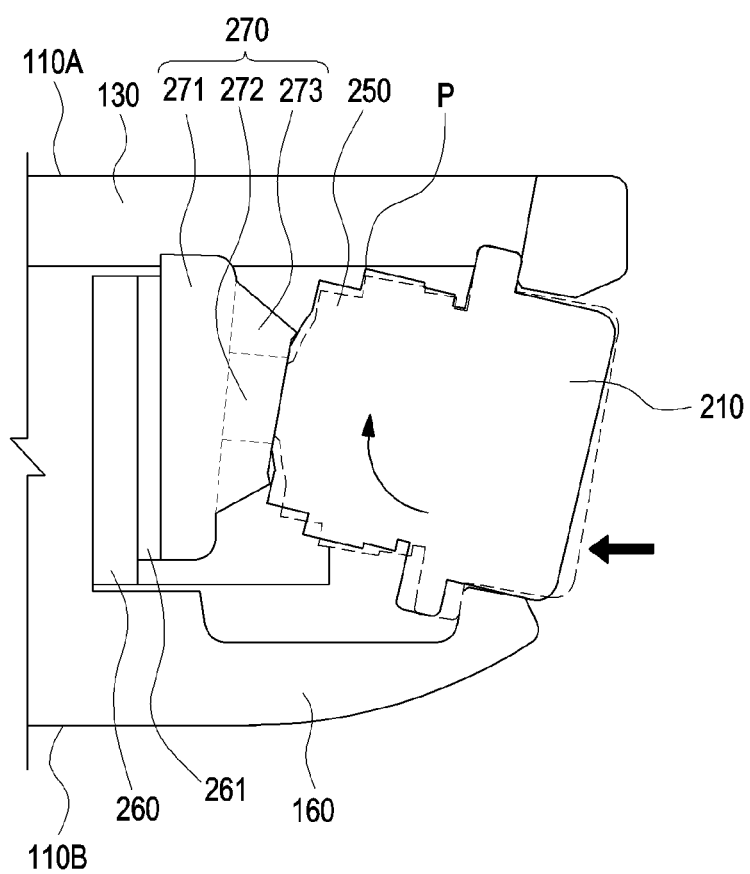
FIG. 6 is a conceptual view illustrating a movement of a button assembly inside an electronic device when a user clicks a button, according to an embodiment of the disclosure.

FIG. 6 is a conceptual view illustrating a movement of a button assembly inside an electronic device when a user clicks a button, according to an embodiment of the disclosure.

Figure 7:
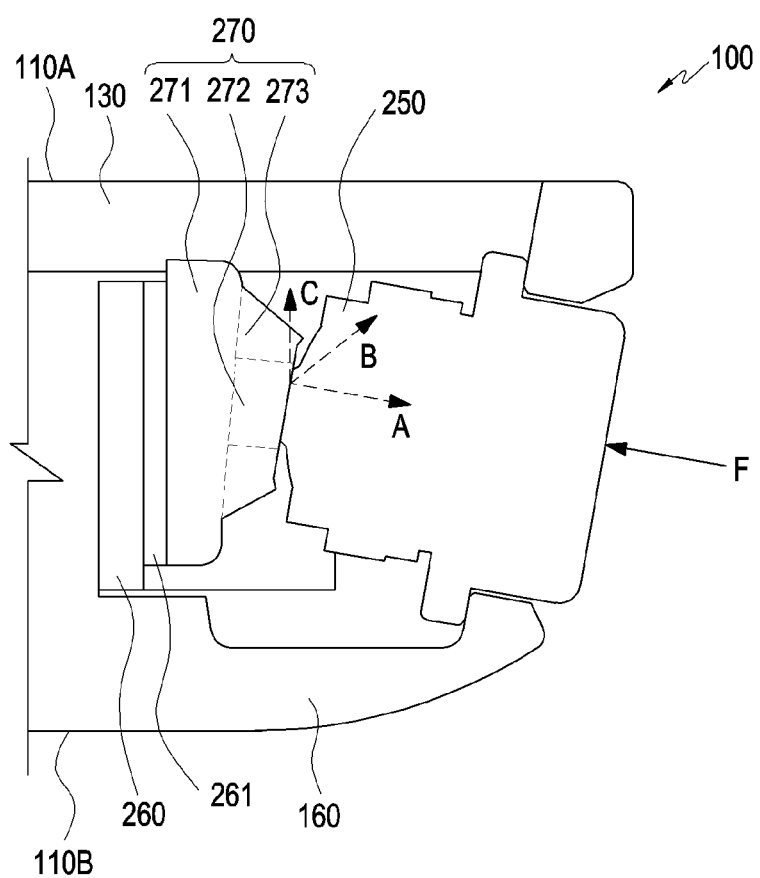
FIG. 7 is a conceptual view illustrating a direction of a force acting on a button assembly inside an electronic device when a user clicks a button, according to an embodiment of the disclosure.

FIG. 7 is a conceptual view illustrating a direction of a force acting on a button assembly inside an electronic device when a user clicks a button, according to an embodiment of the disclosure.

According to an embodiment, when the button member 210 is mounted in an inclined form with respect to a housing (e.g., the rear housing 160), a user may press an eccentric part of the button member 210 rather than the central part thereof. Accordingly, the dome sheet 251 may not be in contact with the center of the block member 270, and may be in contact with a position eccentric from the center of the block member 270. In this case, a force may be non-uniformly transmitted to the button member 210. According to the non-uniform transmission of the force, the dome switch module 250 may slip from the center of the contact surface of the block member 270 toward the edge thereof. In this case, the button member 210 may be inclined in one direction. For example, when a user clicks a lower end of the button member 210, at least a part of the dome switch module 250 may slip from the contact surface of the block member 270. Since a position of the block member 270 is fixed by the bracket 260, an assembly part of the button member 210, the substrate portion, and the dome switch module 250 which configure the button assembly 200 may be rotated in a clockwise direction as shown in FIG. 6. When the button assembly 200 is rotated, a part of the button assembly may be brought into contact with the front housing 130. FIG. 6 shows a state in which a part of the button assembly indicated by reference numeral P is in contact with the front housing 130.

In addition, according to an embodiment, the dome switch module 250 may slip from the surface of the contact portion and thus the button member 210 may be stuck. For example, the button assembly 200 may be stuck in the button hole 112.

Referring to FIGS. 5A to 7 together, in the electronic device according to various embodiments, in order to ensure stability when a user clicks the block member 270, and to allow easy assembly to the housing, the contact portion 272 may be formed to have the contact surface 272A parallel to the touch surface 211A of the button member 210. The touch surface 211A of the button member 210 may be inclined with respect to an inner wall of the housing, and thus a contact surface (e.g., the contact surface 272A in FIG. 5A) of the contact portion may also be formed in an inclined form with respect to the inner wall of the housing. The inner wall of the housing may refer to one of an inner wall 110E of the front housing 130, an inner wall 110D of the rear housing 160, or the bracket 260 shown in FIGS. 5A to 7. That is, the contact portion 272 of the block member 270 may be formed to correspond to an inclination angle of the button member 210. In other words, the central part of the contact portion 272 of the block member 270 may be aligned with the central axis of the button member 210. Accordingly, the contact area between the block member 270 and the dome switch module 250 can be secured to be wider. Even when a user presses an eccentric part of the button member 210 rather than the central part thereof, the amount of slipping of the dome switch module 250 from the surface of the contact portion 272 can be reduced.

According to various embodiments, one surface 271A of the base portion 271 may be perpendicular to the front housing 130 or the rear housing 160. The feature in which the surface 271A of the base portion 271 is perpendicular to the front housing 130 may refer to the feature in which the same is perpendicular to a first direction. The feature in which the surface 271A of the base portion 271 is perpendicular to the rear housing 160 may refer to the feature in which the same is perpendicular to a second direction. According to various embodiments, while the contact portion 272 has a surface parallel to the touch surface 211A of the button member 210, the contact portion may be inclined at a predetermined angle with respect to the front housing or the rear housing in a direction toward the dome switch module. Accordingly, the contact surface 272A of the contact portion 272 may be inclined at a predetermined angle with respect to the surface 271A of the base portion 271, and may be parallel to the touch surface 211A of the button member 210.

According to an embodiment, the contact portion 272 may have a specific elasticity such that the contact portion may be partially pressed at the time of being in contact with a part (e.g., the cap) of the dome switch module 250. For example, when a user presses the button member 210 with a considerable force (F), the block member 270 may apply a considerable stress to the actuator 253 of the dome switch module 250, thereby deforming the actuator 253 or damaging the dome sheet 251. According to various embodiments, due to the specific elasticity of the contact portion 272, a part of the pressure can be absorbed when the surface of the contact portion is deformed (at this time, it becomes concave), and the dome sheet 251 can be prevented from cracking. According to an embodiment, in order not to affect a function of the dome switch module 250, the contact portion 272 may be made of hard rubber and serve to support the dome switch module 250.

The button assembly 200 according to various embodiments may further include the support portion 273 provided on the periphery of the contact portion 272 to prevent the dome switch module 250 from slipping from the contact surface of the block member.

Figure 8A:
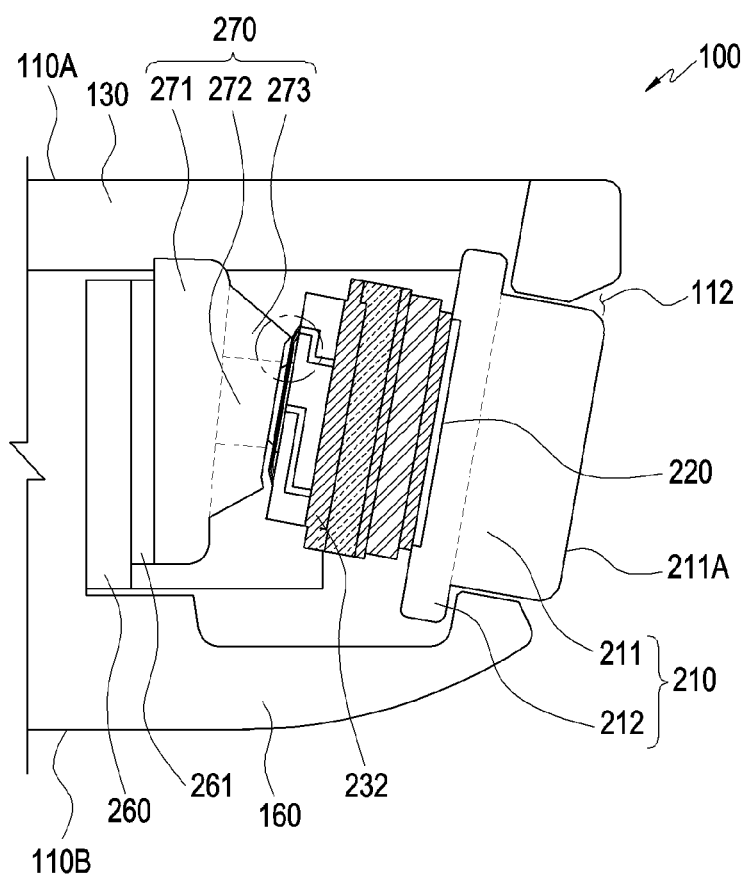
FIG. 8A is a cross-sectional view illustrating a button assembly inside an electronic device according to an embodiment of the disclosure.

FIG. 8A is a cross-sectional view illustrating a button assembly inside an electronic device, according to an embodiment of the disclosure.

Figure 8B:
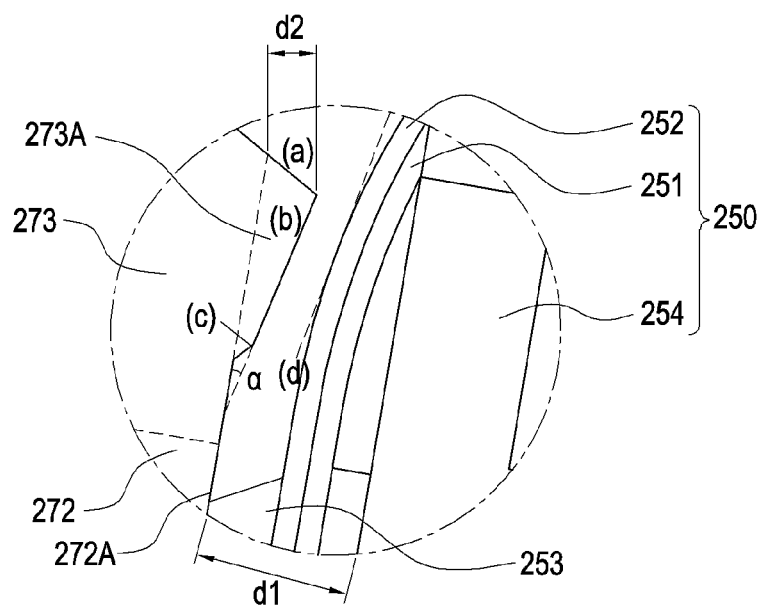
FIG. 8B is an enlarged view of a dashed line area in FIG. 8A according to an embodiment of the disclosure.

FIG. 8B is an enlarged view of a dashed line area in FIG. 8A according to an embodiment of the disclosure.

Referring to FIG. 8A, according to various embodiments, the support portion 273 may be disposed to be adjacent to at least a part of the contact portion 272 and surround at least a part of the contact portion 272. As various examples of assembly of the button assembly 200, for example, when the button assembly is slantly assembled with respect to a side wall (or an outer wall) of the housing, the dome switch module 250 may tend to slip in a specific direction of the contact surface. Therefore, the support portion 273 is not required to be disposed around the entire periphery of the contact portion 272, and may be disposed only at a specific position in order to limit a movement of a switch unit according to a limited direction. The support portion 273 is disposed at a specific position and will be described later.

According to various embodiments, the support portion 273 may include a protrusion portion 273A protruding toward the dome switch module 250. Since the support portion 273 includes the protrusion portion 273A, the support portion 273 may have a support surface higher than the contact surface 272A of the contact portion 272. For example, the dome switch module 250 can be prevented from slipping from the contact surface by being blocked by the convexly protruding protrusion portion 273A of the support portion 273. That is, the amount of slipping of the dome switch module 250 on the block member 270 from the contact surface 272A can be reduced by using the protrusion portion 273A. However, if the block member 270 completely blocks the dome switch module 250 from moving out of the contact surface, the dome switch module 250 may be damaged. Therefore, the protrusion portion 273A may be formed to have a predetermined dimension.

According to an embodiment, the support portion 273 may be made of the same material as the contact portion 272 in order to easily manufacture the block member 270. In this case, the protrusion portion 273A of the support portion 273 can improve the hardness of the outside area of the contact surface 272A of the contact portion 272, and reduce the amount of slipping in the corresponding part. The protrusion portion 273A of the support portion 273 may protrude higher than the contact surface 272A of the contact portion 272, and be in contact with the dome sheet 251 in a state where a button is pressed (e.g., a collapsed state of the dome sheet). According to an embodiment, in order to prevent the support portion 273 from causing excessive damage to the dome sheet 251, a height d2 from the contact portion 272 to the highest surface of the support portion 273 may be required to not exceed a thickness d1 of a dome structure of the dome switch module 250 so as not to affect the dome switch.

According to various embodiments, a support surface (a support surface 273C of FIG. 9 to be described later) of the support portion 273 having a relatively rigid structure compared to the contact portion 272 may be formed in order to increase the contact stability between the support portion 273 and the dome sheet 251 and reduce the amount of slipping of the dome switch module 250 when the dome switch module 250 is in contact with the support portion 273.

Referring to FIG. 8B, for example, the support portion 273 may have a convex surface by including the protrusion portion 273A having a combined cross-sectional profile of line (a), line (b), and line (c). The line (a) may form an outer peripheral surface profile of the support portion 273. The line (b) may form an upper surface (or an inner peripheral surface) of the support portion. The height of the protrusion portion 273A may decrease from the outside of the support portion 273 to the inside. According to various embodiments, the support surface of the support portion 273 may be formed in parallel to a tangent line of the dome sheet at a position corresponding to the support portion 273. For example, the line (b) may be parallel to a tangent line (d) of the dome sheet 251. The line (c) may have a higher slope value than that of the line (b). The line (c) may serve, together with the line (b), as a bump for preventing the dome switch module 250 from sliding backwards. The line (c) is provided, and thus it is possible to reduce the possibility that the dome switch module 250 slips from the contact surface 272A of the contact portion 272.

Figure 9:
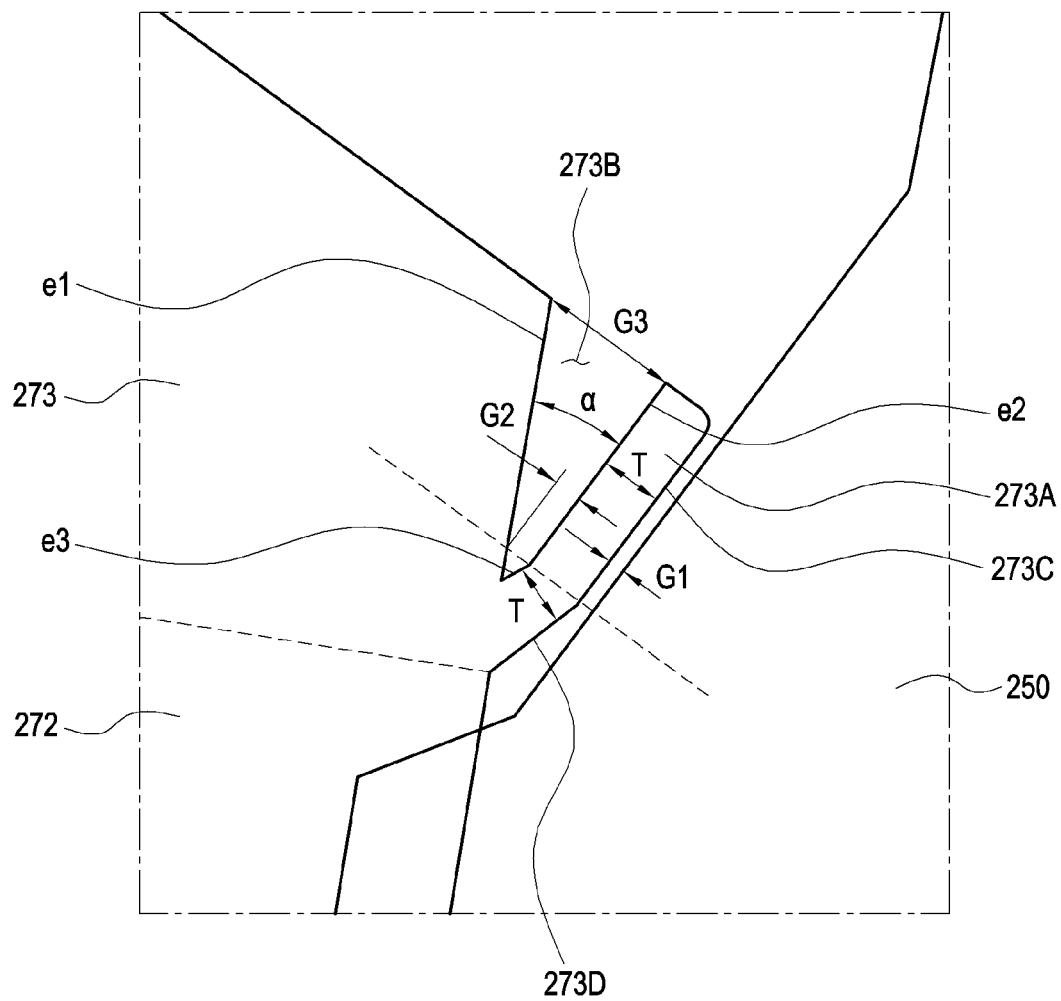
FIG. 9 illustrates a support portion having a protrusion portion and a recess additionally formed thereon, according to an embodiment of the disclosure.

FIG. 9 illustrates a support portion in which a recess is additionally formed, according to an embodiment of the disclosure.

According to various embodiments, the contact portion 272 of the block member 270 may be made of an elastic material. Accordingly, the dome switch module 250 can be prevented from moving out of the contact portion 272. However, in order not to damage a dome of the dome switch module 250, the contact portion 272 may be made to slip on the dome switch module.

According to various embodiments, the dome switch module 250 can be prevented from slipping further from the contact surface 272A by a hard material of the support portion 273. According to an embodiment, the support portion 273 may be made of a hard rubber material to provide high hardness.

When the button member 210 and the dome switch module 250 are assembled with the block member 270 to form the button assembly 200, a predetermined overlap may exist between the contact portion 272 and the dome switch module 250 even in a state in which force is not applied. In the contact portion 272 overlapping with the dome switch module 250, an elastic part may be deformed, but the support portion 273 made of a material harder than the contact portion 272 may not be deformed or may have a smaller degree of deformation than the contact portion 272.

In order to prevent the support portion 273 from causing damage by coming into contact with the dome sheet 251, a height from the contact portion 272 to the highest surface of the support portion 273 is required to not exceed a thickness of the dome structure of the dome switch module 250 so as to prevent the block member 270 from affecting the dome sheet 251 in a state where the actuator 253 is pressed. The thickness of the dome structure may mean the thickness of the dome sheet 251 and the actuator 253. If the height of the support portion 273 is increased to prevent the dome switch module 250 from slipping, the protrusion portion 273A of the support portion 273 is not temporarily in contact with the dome switch module 250 to support the same in a collapsed state of the dome switch module 250, but may be continuously or permanently in contact with the dome switch module. This may affect an operation of the dome switch module 250 when a user clicks a button (for example, it interferes with the deformation of the dome sheet 251), and thus degrade the click feeling.

Referring back to FIG. 9, according to various embodiments, the support portion 273 may include the protrusion portion 273A protruding toward the dome switch module and the recess 273B formed on a rear surface of the protrusion portion 273A.

While the support portion 273 can prevent the dome switch module 250 from slipping from the contact portion 272, the recess 273B is included, so that the support portion 273 is pushed in the direction of the recess 273B at the time of being in contact with the dome switch module 250 and thus an impact on the dome switch module 250 can be reduced. In addition, the support portion 273 includes the recess 273B so that, even when the support portion 273 is sufficiently large, the support surface 273C of the protrusion portion 273A can be prevented from affecting an operation of the dome switch module 250 and degrading the click feeling.

According to an embodiment, the support portion 273 may include the recess 273B on a rear surface of the support surface 273C of the protrusion portion 273A. The recess 273B may include a first edge e1, a second edge e2, and a third edge e3.

According to various embodiments, a position where the recess 273B is formed may be formed at a position higher than the contact surface 272A of the contact portion 272 in order to allow the protrusion portion 273A to be deformed more flexibly.

According to various embodiments, the first edge e1 of the recess 273B may be formed in parallel to the contact surface of the contact portion 272.

According to various embodiments, the second edge e2 of the recess 273B may be formed in parallel to the support surface 273C of the protrusion portion 273A of the support portion 273 in order to maintain the deformation of the protrusion portion 273A of the support portion 273.

According to various embodiments, the third edge e3 of the recess 273B may be formed in parallel to a second support surface 273D of the support portion 273 to form the protrusion portion 273A to have the same thickness T.

According to various embodiments, a gap G1 may be the minimum distance between the support surface 273C of the protrusion portion 273A and the dome sheet 251.

According to various embodiments, a gap G2 may be a distance through which the protrusion portion 273A can move in a state where the dome sheet 251 is folded. In addition, the gap G2 may be the minimum distance between the first edge e1 and the second edge e2.

According to various embodiments, a gap G3 may be the largest size of an opening of the recess 273B.

In order to cause the dome sheet 251 and the support portion 273 not to overlap in a state where the dome sheet 251 is in contact with the contact portion 272 and is thus pressed, the sum of the gap G1 and the gap G2 may be greater than the thickness d1 of the dome structure of the dome switch module 250.

Further, the recess 273B may be made by an injection or laser manufacturing method. Accordingly, the gap G3 may be formed larger than the gap G2.

Figure 10A:
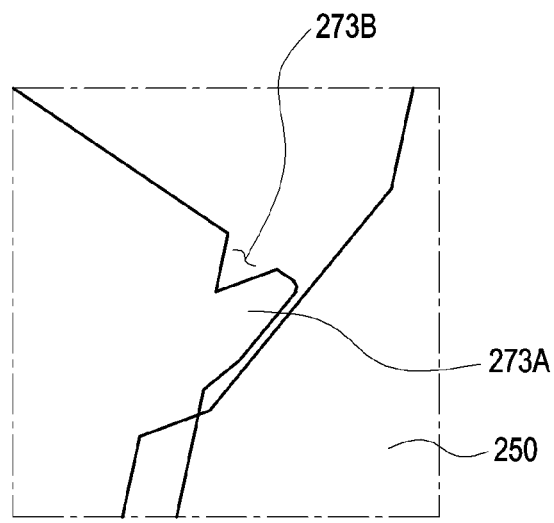
FIG. 10A illustrates a support portion having a recess formed thereon, according to an embodiment of the disclosure.

FIG. 10A illustrates a support portion having a recess formed thereon, according to an embodiment of the disclosure.

Figure 10B:
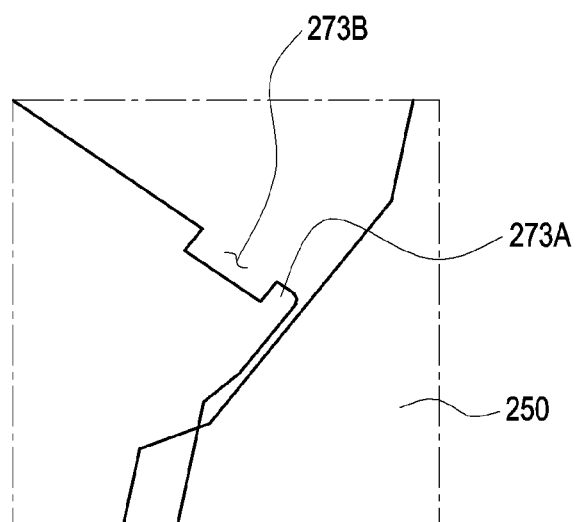
FIG. 10B illustrates a support portion having a recess formed thereon, different from that of FIG. 10A, according to an embodiment of the disclosure.

FIG. 10B illustrates a support portion having a recess formed thereon, different from that of FIG. 10A, according to an embodiment of the disclosure.

Figure 10C:
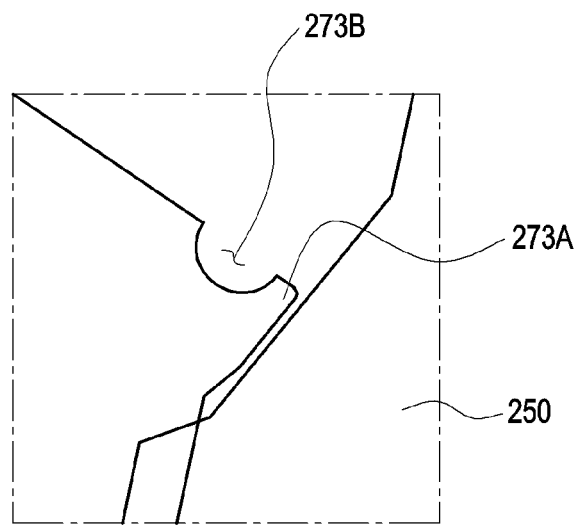
FIG. 10C illustrates a support portion having a recess formed thereon, different from that of FIG. 10A, according to an embodiment of the disclosure.

FIG. 10C illustrates a support portion having a recess formed thereon, different from that of FIG. 10A, according to an embodiment of the disclosure.

Referring to FIGS. 10A, 10B and 10C, a shape of the recess 273B may be variously formed. For example, the support portion 273 may include a recess 273B having a triangular cross-section as shown in FIG. 10A, a recess 273B having a rectangular cross-section as shown in FIG. 10B, or a recess 273B having a circular cross-section as shown in FIG. 10C. In addition, various other embodiments of the recess 273B may be applied.

Figure 11A:
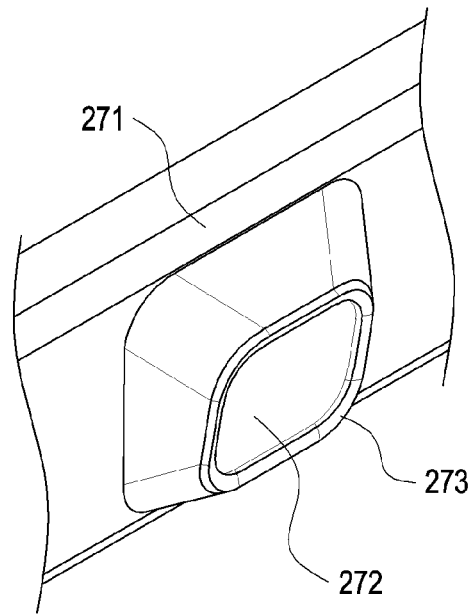
FIG. 11A is a perspective view illustrating a block member according to an embodiment of the disclosure.

FIG. 11A is a perspective view illustrating a block member according to an embodiment of the disclosure.

Figure 11B:
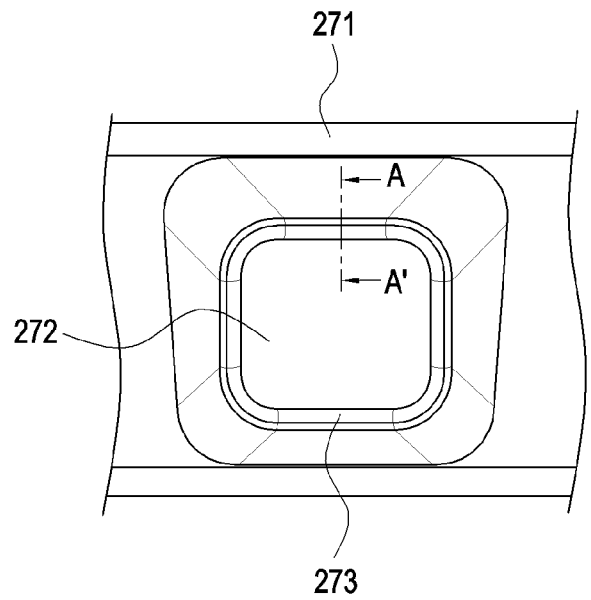
FIG. 11B is a front view illustrating a block member according to an embodiment of the disclosure.

FIG. 11B is a front view illustrating a block member according to an embodiment of the disclosure.

Referring to FIGS. 11A and 11B, the block member 270 may include the contact portion 272 disposed on one surface of the base portion 271, and the support portion 273 disposed on the periphery of the contact portion. The contact portion 272 may be formed to protrude from one surface of the base portion 271 to have a predetermined height, and the contact surface of the contact portion 272 may be formed to be inclined with respect to one surface (e.g., one surface 271A of FIG. 5A) of the base portion 271.

According to an embodiment, the support portion 273 may be formed to surround the contact portion 272 along an edge of the contact portion 272. The support portion 273 may be formed to protrude more than the contact portion 272 protruding from the base portion 271.

Hereinafter, various shapes and arrangement forms of the support portion 273 will be described through the embodiments of FIGS. 12A to 13D.

Figure 12A:
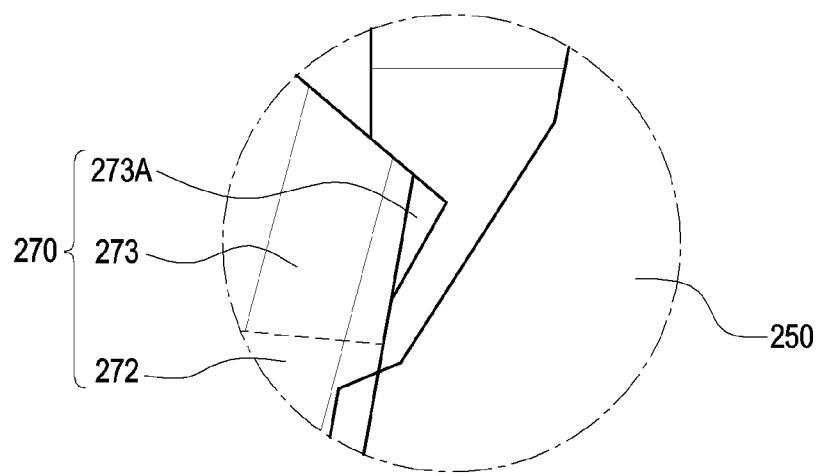
FIG. 12A is a cross-sectional view illustrating a shape of a protrusion portion of a support portion, according to an embodiment of the disclosure.

FIG. 12A is a cross-sectional view illustrating a shape of a protrusion portion of a support portion, according to an embodiment of the disclosure.

Figure 12B:
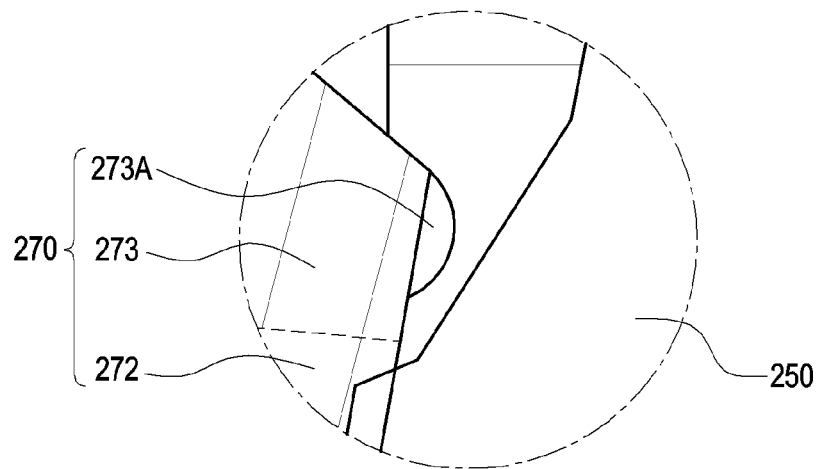
FIG. 12B is a cross-sectional view illustrating a shape of a protrusion portion of a support portion, different from that of FIG. 12A, according to an embodiment of the disclosure.

FIG. 12B is a cross-sectional view illustrating a shape of a protrusion portion of a support portion, different from that of FIG. 12A, according to an embodiment of the disclosure.

Figure 12C:
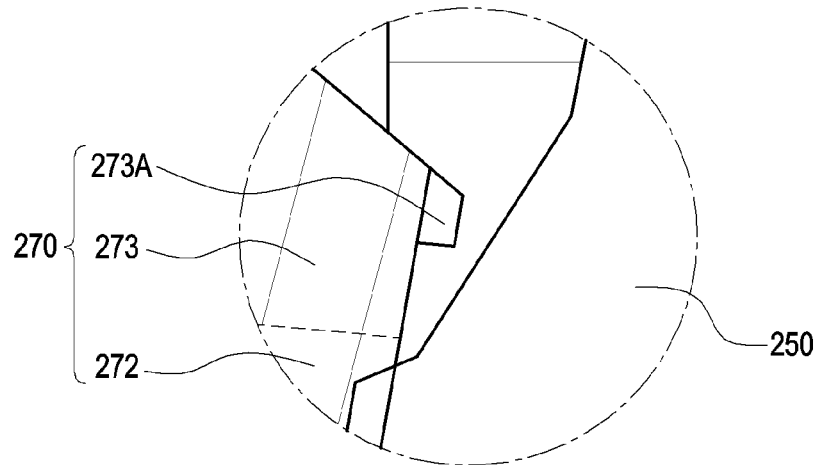
FIG. 12C is a cross-sectional view illustrating a shape of a protrusion portion of a support portion, different from that of FIG. 12A, according to an embodiment of the disclosure.

FIG. 12C is a cross-sectional view illustrating a shape of a protrusion portion of a support portion, different from that of FIG. 12A, according to an embodiment of the disclosure.

Referring to FIGS. 12A, 12B and 12C, a shape of the protrusion portion 273A of the support portion 273 may be variously formed. For example, a protrusion portion 273A having a triangular cross-section as shown in FIG. 12A, a protrusion portion 273A having a circular cross-section as shown in FIG. 12B, and a protrusion portion 273A having a rectangular cross-section as shown in FIG. 12C may be included. In addition, various other embodiments of the protrusion portion 273A may be applied.

Figure 13A:
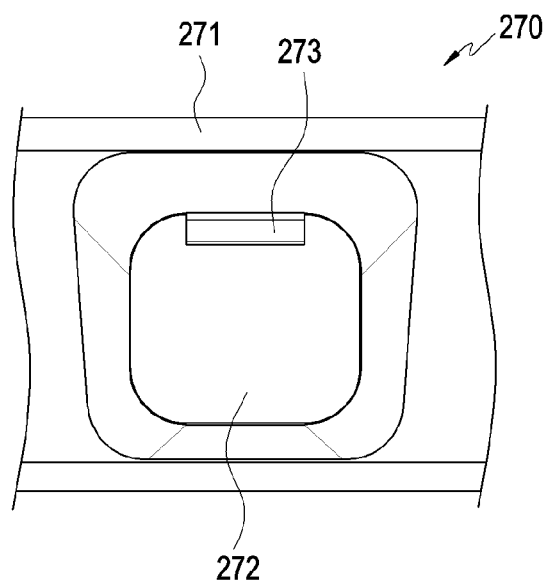
FIG. 13A is a cross-sectional view illustrating a position where a support portion is disposed on the periphery of a contact portion, according to an embodiment of the disclosure.

FIG. 13A is a cross-sectional view illustrating a position where a support portion is disposed on the periphery of a contact portion, according to an embodiment of the disclosure.

Figure 13B:
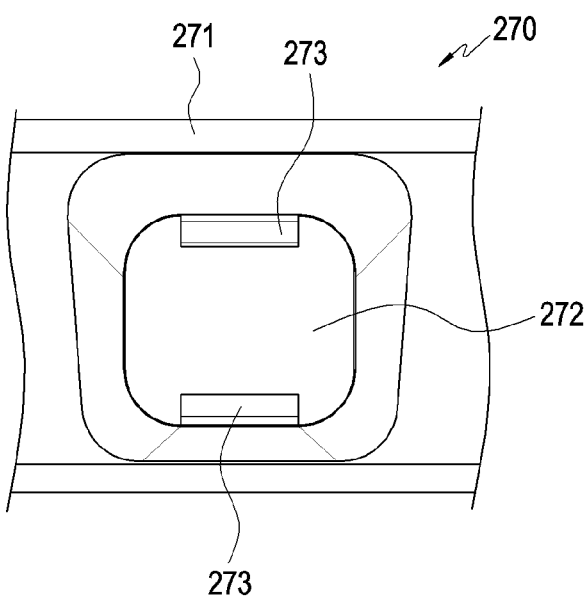
FIG. 13B is a cross-sectional view illustrating a position where a support portion is disposed, different from that of FIG. 13A, according to an embodiment of the disclosure.

FIG. 13B is a cross-sectional view illustrating a position where a support portion is disposed, different from that of FIG. 13A, according to an embodiment of the disclosure.

Figure 13C:
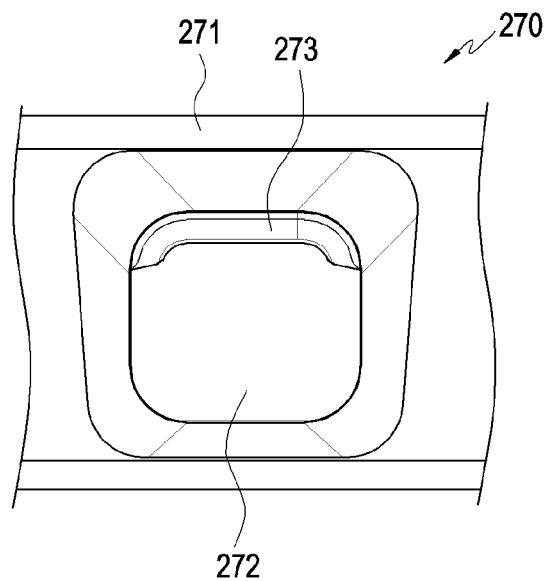
FIG. 13C is a cross-sectional view illustrating a position where a support portion is disposed, different from that of FIG. 13A, according to an embodiment of the disclosure.

FIG. 13C is a cross-sectional view illustrating a position where a support portion is disposed, different from that of FIG. 13A, according to an embodiment of the disclosure.

Figure 13D:
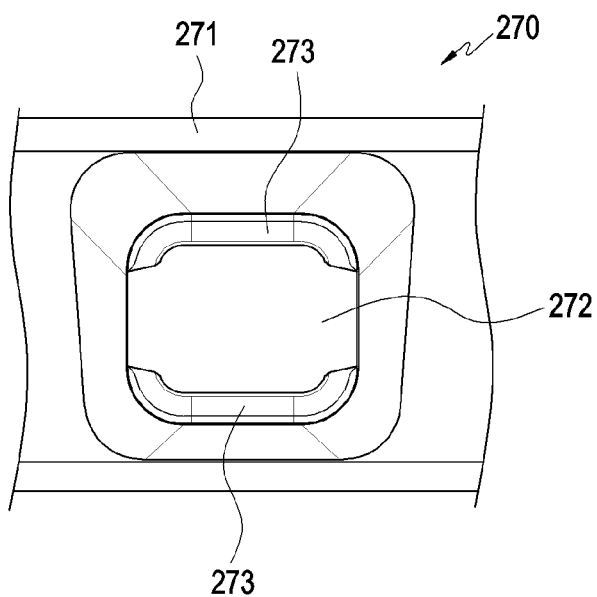
FIG. 13D is a cross-sectional view illustrating a position where a support portion is disposed, different from that of FIG. 13A, according to an embodiment of the disclosure.

FIG. 13D is a cross-sectional view illustrating a position where a support portion is disposed, different from that of FIG. 13A, according to an embodiment of the disclosure.

Referring to FIGS. 13A, 13B, 13C and 13D, the block member 270 may include the support portion 273 disposed on the periphery of the contact portion 272. The dome switch module 250 may slip in one direction on the contact surface 272A of the contact portion 272 when a user clicks a button. Therefore, it may be sufficient that the support portion 273 is not continuously disposed as shown in FIGS. 11A and 11B along the periphery of the contact portion 272, but is intermittently disposed as shown in FIGS. 13A to 13D. That is, the support portion 273 may not be disposed along the entire periphery of the contact portion 272, but may be disposed only on a part of the periphery.

According to various embodiments, a position of the support portion 273 may be variously formed. For example, the support portion may be disposed on an upper end of the contact portion 272 as shown in FIG. 13A, and as shown in FIG. 13B, a plurality of support portions may be formed and disposed on an upper end and a lower end of the contact portion 272, respectively. In addition, as shown in FIG. 13C, the support portion 273 may be disposed along the shape of the upper end periphery of the contact portion 272. In addition, as shown in FIG. 13C, two support portions 273 may be disposed along the shape of the upper and lower end peripheries of the contact portion 272.

Figure 14A:
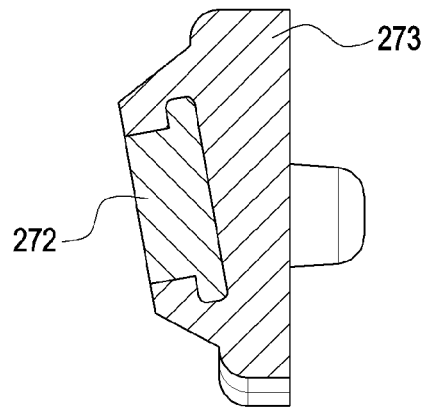
FIG. 14A illustrates cross-sectional shapes and materials of a support portion and a contact portion, according to an embodiment of the disclosure.

FIG. 14A illustrates cross-sectional shapes and materials of a support portion and a contact portion, according to an embodiment of the disclosure.

Figure 14B:
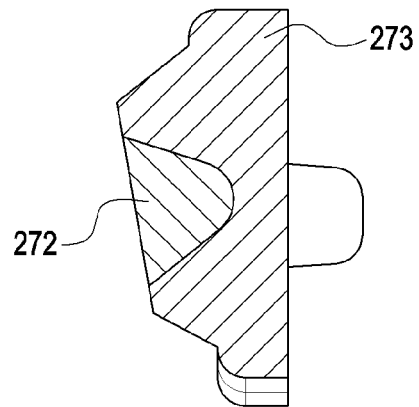
FIG. 14B illustrates cross-sectional shapes and materials of a support portion and a contact portion, different from that of FIG. 14A, according to an embodiment of the disclosure.

FIG. 14B illustrates cross-sectional shapes and materials of a support portion and a contact portion, different from that of FIG. 14A, according to an embodiment of the disclosure.

Figure 14C:
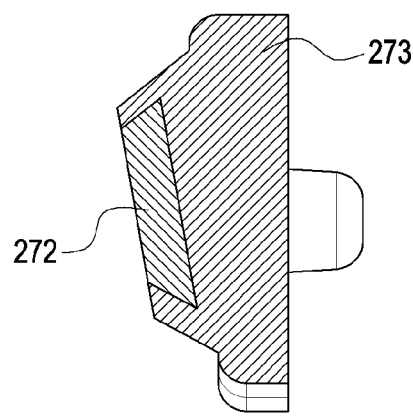
FIG. 14C illustrates cross-sectional shapes and materials of a support portion and a contact portion, different from that of FIG. 14A, according to an embodiment of the disclosure.

FIG. 14C illustrates cross-sectional shapes and materials of a support portion and a contact portion, different from that of FIG. 14A, according to an embodiment of the disclosure.

Referring to FIGS. 14A to 14C, the support portion 273 may have a material different from that of the contact portion 272.

The support portion 273 may have a relatively higher hardness than the contact portion 272. The support portion 273 may be formed of a hard material to have a higher hardness than the contact portion 272. According to various embodiments, the contact portion 272 may be configured such that the switch unit can overlap the block member, and a part of the pressure can be absorbed through deformation of the surface of the contact portion. In addition, the contact portion 272 may have a predetermined elasticity to be able to prevent cracking and damage of a dome. However, the support portion 273 may have a higher hardness than the contact portion 272 in order to prevent the actuator 253 from slipping from the surface of the support portion 273.

For example, the contact portion 272 may be formed of a material such as silicone, rubber, and urethane, and the support portion 273 may be formed of a relatively harder material than the contact portion 272, including a material such as polycarbonate (PC), acrylonitrile butadiene styrene (ABS), acrylic, and metal. However, materials of the contact portion 272 and the support portion 273 may be variously configured according to the type of the electronic device 100 and/or specifications required for the button assembly 200 such as lifespan guarantee and impact resistance.

Various embodiments may provide an electronic device (e.g., the electronic device 100 of FIG. 5A) including a button assembly, the electronic device including: a housing (e.g., the housing 110 of FIG. 2) which includes a front housing (e.g., the front housing 130 of FIG. 5A) facing a first direction (e.g., the first), and a rear housing (e.g., the rear housing 160 of FIG. 5A) facing a second direction (e.g., the second direction) opposite to the first direction, and forming a space (e.g., the space S of FIG. 5A) between the front housing and the rear housing; a button member (e.g., the button member 210 of FIG. 5A) which is at least partially exposed to the outside of the housing through at least a part of the rear housing 160; a substrate portion (e.g., the substrate portion 230 of FIG. 4A) disposed on one surface of the button member in the space; a dome switch module (e.g., the dome switch module 250 of FIG. 5A) mounted on the substrate portion; a bracket (e.g., the bracket 260 of FIG. 5A) mounted in a direction perpendicular to the front housing or the rear housing; and a block member (e.g., the block member 270 of FIG. 5A) which is disposed between the dome switch module and the bracket and includes a base portion (e.g., the base portion 271 of FIG. 5A) coupled to one surface of the bracket, a contact portion (e.g., the contact portion 272 of FIG. 5A) in contact with the dome switch module, and a support portion (e.g., the support portion 273 of FIG. 5A) disposed on the periphery of the contact portion, wherein one surface (e.g., one surface 271A of FIG. 5A) of the base portion 271 is perpendicular to the front housing 130 or the rear housing 160, and the contact portion 272 is inclined at a predetermined angle with respect to the front housing or the rear housing in a direction toward the dome switch module.

According to various embodiments, the electronic device may further include a fingerprint recognition sensor (e.g., the fingerprint sensor unit 220 of FIG. 5A) disposed between the button member 210 and the substrate portion 230.

According to various embodiments, the substrate portion may include a first FPCB positioned to correspond to the fingerprint sensor unit 220, and a second FPCB positioned to correspond to the dome switch module.

According to various embodiments, the electronic device may further include a first adhesive tape for bonding between the first FPCB and the second FPCB.

According to various embodiments, the button member 210 may further include a button top 211 exposed to the outside of the housing, and a flange 212 for preventing the button member from being separated in a direction opposite to a button-pressing direction inside the housing.

According to various embodiments, the dome switch module may include a button assembly including: a dome sheet for providing a contact function; a dome switch case for allowing the dome sheet to be mounted thereon; and a switch electrode disposed inside the dome switch case.

According to various embodiments, the dome switch module may further include an actuator covering a tip of the dome sheet.

According to various embodiments, the dome switch case may include a first conductive trace and a second conductive trace for electrically connecting the switch electrode and the substrate portion.

According to various embodiments, the support portion 273 may include a protrusion portion protruding toward the dome switch module.

According to various embodiments, a height of the protrusion portion may be formed to be lower than a thickness of the dome switch module.

According to various embodiments, the electronic device may further include a recess formed under the surface of the protrusion portion.

According to various embodiments, the support portion may be disposed on a part of the periphery of the contact portion.

According to various embodiments, the support portion may be formed of a material having a higher hardness than that of the contact portion.

According to various embodiments, the electronic device may further include a second adhesive tape disposed between the bracket and the base portion to limit a movement of the block member.

According to various embodiments, the rear housing may include a side member and a rear plate.

Various embodiments may provide an electronic device 100 including a button assembly, the electronic device including: a housing 110 which includes a front housing 130 facing a first direction, and a rear housing 160 facing a second direction opposite to the first direction, and forming a space between the front housing and the rear housing; a button member 210 which is at least partially exposed to the outside of the housing through at least a part of the rear housing 160; a substrate portion 230 disposed on one surface of the button member in the space; a dome switch module 250 mounted on the substrate portion; a bracket 260 mounted on the front housing or the rear housing; and a block member 270 which is disposed between the dome switch module and the bracket and includes: a base portion 271 coupled to one surface of the bracket; a contact portion 272 in contact with the dome switch module; and a support portion 273 disposed on the periphery of the contact portion, wherein the support portion 273 includes a protrusion portion protruding toward the dome switch module, and a height of the protrusion portion is formed to be lower than a thickness of a cap of the dome switch module.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, and/or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software including one or more instructions that are stored in a storage medium (e.g., the internal memory 136 or the external memory 138) that is readable by a machine (e.g., the electronic device 100). For example, a processor of the machine (e.g., the electronic device 100) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising a button assembly, the electronic device comprising:
    a housing which comprises a front housing facing a first direction, and a rear housing facing a second direction opposite to the first direction, and forming a space between the front housing and the rear housing;
    a button member which is at least partially exposed to an outside of the housing through at least a part of the rear housing;
    a substrate portion disposed on one surface of the button member in the space;
    a dome switch module mounted on the substrate portion;
    a bracket; and
    a block member which is disposed between the dome switch module and the bracket and comprises:
        a base portion coupled to one surface of the bracket,
        a contact portion in contact with the dome switch module, and
        a support portion disposed on a periphery of the contact portion,
    wherein one surface of the base portion is perpendicular to the front housing or the rear housing, and
    wherein the contact portion is inclined at a predetermined angle with respect to the front housing or the rear housing in a direction toward the dome switch module.

2. The electronic device of claim 1, further comprising a fingerprint recognition sensor disposed between the button member and the substrate portion.

3. The electronic device of claim 2, wherein the substrate portion comprises:
    a first flexible printed circuit board (FPCB) positioned to correspond to the fingerprint recognition sensor; and
    a second FPCB positioned to correspond to the dome switch module.

4. The electronic device of claim 3, further comprising a first adhesive tape configured to bond between the first FPCB and the second FPCB.

5. The electronic device of claim 1, wherein the button member comprises:
    a button top exposed to the outside of the housing; and
    a flange configured to prevent the button member from being separated in a direction opposite to a button-pressing direction inside the housing.

6. The electronic device of claim 1, wherein the dome switch module comprises:
    a dome sheet configured to provide a contact function;
    a dome switch case configured to allow the dome sheet to be mounted thereon; and
    a switch electrode disposed inside the dome switch case.

7. The electronic device of claim 6, wherein the dome switch module further comprises an actuator configured to cover a tip of the dome sheet.

8. The electronic device of claim 6, wherein the dome switch case comprises a first conductive trace and a second conductive trace configured to electrically connect the switch electrode and the substrate portion.

9. The electronic device of claim 1, wherein the support portion comprises a protrusion portion protruding toward the dome switch module.

10. The electronic device of claim 9, wherein a height of the protrusion portion is formed to be lower than a thickness of a cap of the dome switch module.

11. The electronic device of claim 9, further comprising a recess formed under a surface of the protrusion portion.

12. The electronic device of claim 9, wherein the support portion is disposed on a part of the periphery of the contact portion.

13. The electronic device of claim 9, wherein the support portion is formed of a material having a higher hardness than that of the contact portion.

14. The electronic device of claim 1, further comprising a second adhesive tape disposed between the bracket and the base portion to limit a movement of the block member.

15. The electronic device of claim 1, wherein the rear housing comprises a side member and a rear plate.

16. An electronic device comprising a button assembly, the electronic device comprising:
   a housing which comprises a front housing facing a first direction, and a rear housing facing a second direction opposite to the first direction, and forming a space between the front housing and the rear housing;
   a button member which is at least partially exposed to the outside of the housing through at least a part of the rear housing;
   a substrate portion disposed on one surface of the button member in the space;
   a dome switch module mounted on the substrate portion;
   a bracket mounted on the front housing or the rear housing; and
   a block member which is disposed between the dome switch module and the bracket and comprises:
      a base portion coupled to one surface of the bracket,
      a contact portion in contact with the dome switch module, and
      a support portion disposed on a periphery of the contact portion,
   wherein the support portion comprises a protrusion portion protruding toward the dome switch module, and
   wherein a height of the protrusion portion is formed to be lower than a thickness of the dome switch module.

17. The electronic device of claim 16, further comprising a fingerprint recognition sensor disposed between the button member and the substrate portion.

18. The electronic device of claim 17, wherein the substrate portion comprises:
   a first FPCB positioned to correspond to the fingerprint recognition sensor; and
   a second FPCB positioned to correspond to the dome switch module.

19. The electronic device of claim 16, wherein the dome switch module comprises:
   a dome sheet configured to provide a contact function;
   a dome switch case configured to allow the dome sheet to be mounted thereon; and
   a switch electrode disposed inside the dome switch case.

20. The electronic device of claim 16, wherein the support portion is formed of a material having a higher hardness than that of the contact portion.

* * * * *